(12) United States Patent
Ryf et al.

(10) Patent No.: US 8,223,188 B2
(45) Date of Patent: Jul. 17, 2012

(54) MONITOR HAVING INTEGRAL CAMERA AND METHOD OF OPERATING THE SAME

(75) Inventors: Roland Ryf, Aberdeen, NJ (US); Edward L. Sutter, Jr., Fanwood, NJ (US)

(73) Assignee: Alcatel Lucent, Paris (FR)

( * ) Notice: Subject to any disclaimer, the term of this patent is extended or adjusted under 35 U.S.C. 154(b) by 972 days.

(21) Appl. No.: 12/211,799

(22) Filed: Sep. 16, 2008

(65) Prior Publication Data

US 2010/0066800 A1 Mar. 18, 2010

(51) Int. Cl.
*H04N 7/14* (2006.01)

(52) U.S. Cl. ............... 348/14.01; 348/14.08; 348/14.16

(58) Field of Classification Search ............... 348/14.01, 348/14.07, 14.08, 14.16, 211.11, 211.12, 348/294, 333.01, 333.1; 709/204; 370/259, 370/260; 345/7, 32, 697
See application file for complete search history.

(56) References Cited

U.S. PATENT DOCUMENTS

| | | | |
|---|---|---|---|
| 6,926,850 B2 | 8/2005 | Bolle | |
| 7,535,502 B2 * | 5/2009 | Rambaldi et al. | 348/247 |
| 2005/0128332 A1 * | 6/2005 | Tsuboi | 348/333.12 |
| 2006/0007222 A1 | 1/2006 | Uy | |
| 2007/0002130 A1 * | 1/2007 | Hartkop | 348/14.16 |
| 2008/0165267 A1 | 7/2008 | Cok | |

FOREIGN PATENT DOCUMENTS

| | | |
|---|---|---|
| EP | 1209901 A1 | 5/2002 |
| JP | 2005031480 | 2/2005 |

* cited by examiner

*Primary Examiner* — Tuan Nguyen
(74) *Attorney, Agent, or Firm* — Hitt Gaines, PC

(57) ABSTRACT

As discussed herein, there is presented a visual communication system, a method of conducting two-way visual communication and an apparatus. In one embodiment, the apparatus includes: (1) a lens substrate having a first array of micro lenses on one side thereof, (2) an optical output substrate having a second array of display pixels and (3) an optical input substrate having a third array of image sensors laterally inter-dispersed with respect to display pixels of the first array and positioned to receive light from the micro lenses of the first array.

20 Claims, 4 Drawing Sheets

MONITOR HAVING INTEGRAL CAMERA AND METHOD OF OPERATING THE SAME

TECHNICAL FIELD

The invention is directed, in general, to display and image-capture devices and, more specifically, to a device having both display and image-capture capability.

BACKGROUND

Communication via computer networks frequently involves far more than transmitting text. Computer networks, such as the Internet, can also be used for audio communication and visual communication. Still images and video are examples of visual data that may be transmitted over such networks.

A camera may be coupled to a personal computer (PC) to provide visual communication. The camera can then be used to transmit real-time visual information, such as video, over a computer network. A duplex transmission can be used to allow audio transmission with the video information. Thus, participants can communicate via audio and video in real time over a computer network. (i.e., voice-video communication).

SUMMARY

One aspect of the invention provides an apparatus. In one embodiment, the apparatus includes: (1) a lens substrate having a first array of micro lenses on one side thereof, (2) an optical output substrate having a second array of display pixels and (3) an optical input substrate having a third array of image sensors laterally inter-dispersed with respect to display pixels of the first array and positioned to receive light from the micro lenses of the first array.

Another aspect of the invention provides a visual communication system. In one embodiment, the visual communication system includes: (1) a lens substrate having an array of micro lenses on one side thereof, (2) an optical output substrate having an array of display pixels, (3) an optical input substrate having an array of image sensors being laterally interleaved with respect to the display pixels of the optical output substrate and being positioned to receive light from the array of micro lenses, (4) at least one active matrix to address the array of display pixels and the array of image sensors, and (5) a controller configured to direct addressing of the array of image sensors and the array of display pixels via the at least one active matrix.

Yet another aspect of the invention provides a method of conducting two-way visual communication. In one embodiment, the method includes: (1) receiving a first image to display (2) illuminating an array of display pixels to display the first image to a viewer and (3) capturing a second image via an array of image sensors, the image sensors being laterally interleaved between the display pixels.

BRIEF DESCRIPTION OF THE DRAWINGS

For a more complete understanding of the invention, reference is now made to the following descriptions taken in conjunction with the accompanying drawings, in which.

DETAILED DESCRIPTION

During voice-video communication sessions, the visual images transmitted depend on the placement of the camera. Thus, when communicating, participants are unable to look at each other "eye-to-eye" since a disparity exists between the location of the camera or cameras and the PC's display screen. Disclosed embodiments allow more realistic voice-video communications.

Various embodiments provide visual communication systems that allow voice-video communication participants to perceive that they are looking directly at each other instead of through the different axes of a screen and a PC camera. The visual communication system achieves aligned or substantially aligned viewing axes for the participants by interleaving display pixels with image pixels. As such, the input axis (i.e., camera) and output axis (i.e., display) of the visual communication system for each participant is substantially the same. The viewing disparity would therefore be greatly reduced or at least substantially eliminated. Therefore, no need exists to compensate for the awkward view that is present in typical "camera-over-the-screen" techniques used today. Communication sessions can then better simulate a person-to-person meeting.

Various embodiments introduce a display with an integrated distributed camera constructed by embedding camera pixels (i.e., image sensors) in the display and employing so-called "micro lenses" to allow the image sensors to capture light from predetermined directions such that they cooperate to capture an image. An array of the image sensors can be embedded in an active layer of electronics and pixel addressing logic used to address display pixels. The active layer may also be employed for reading the light intensity reaching the image sensors.

Figure 1:
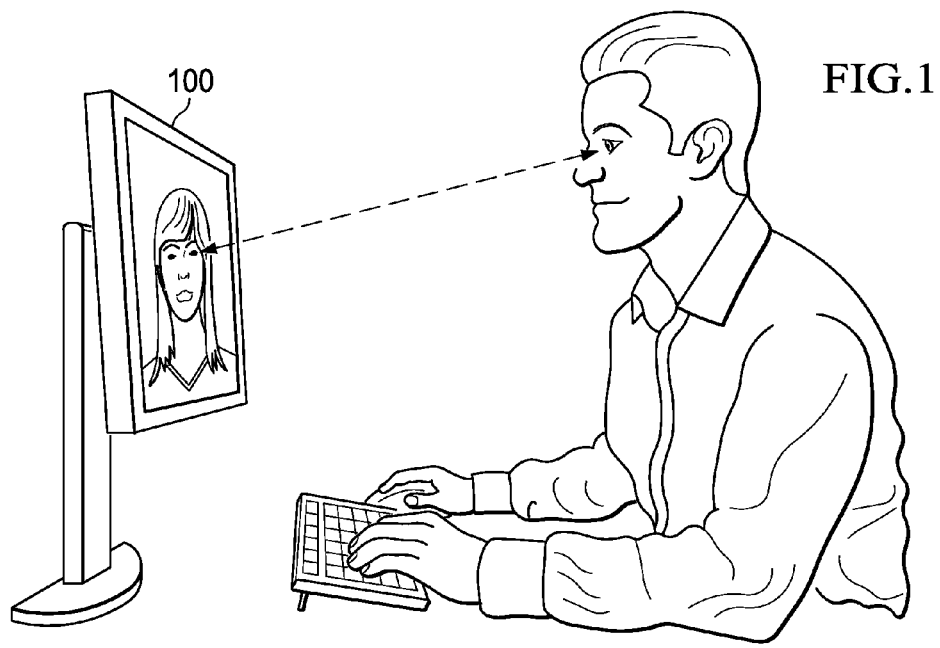
FIG. 1 illustrates a diagram of an environment where a computer monitor, having an embodiment of a visual communication system constructed according to the principles of the invention, is being used for video communication.
Figure 2:
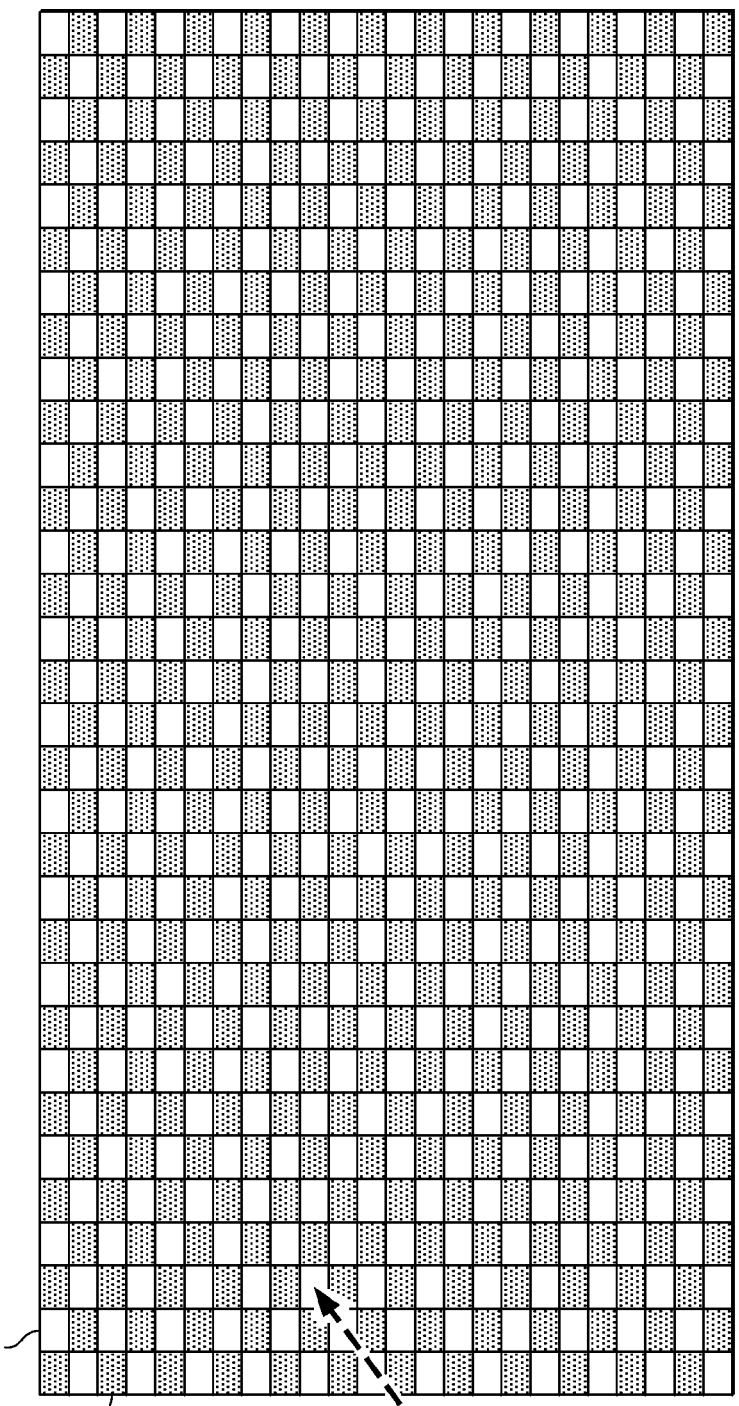
FIG. 2 illustrates a front view of an embodiment of a visual communication system constructed according to the principles of the invention that demonstrates an interleaved array of display and image pixels.

FIG. 1 illustrates an environment where a computer monitor 100, having an embodiment of a visual communication system, is being used for voice-video communication. The monitor 100 includes components typically employed in a conventional computer monitor. Additionally, the monitor 100 includes the visual communication system having both an optical input substrate and an optical output substrate that allows the perception that participants of a voice-video communication session are looking "eye-to-eye." The optical substrates are combined to create inter-dispersed arrays of display and image pixels that provide or at least substantially provide a common camera and display axis for participants of voice-video communication sessions. As such, the disparity between the axis of a PC camera and the axis of a display screen during a voice-video communication session can be eliminated or at least substantially reduced. FIG. 2 discussed below illustrates an example of inter-dispersed arrays when the arrays are interleaved.

In addition to the monitor 100, the visual communication system may be used in various products where voice-video communication is used. For example, the visual communication system can also be used in a TelePrompTer® and with drive-through windows. The visual communication system may also be used in other applications besides person-to-person communication. In some embodiments, the visual communication system can be used on a wall to provide a transparent structure wherein display pixels on each side of the wall display what is on the other side of the wall via image sensors.

FIG. 2 illustrates a front view of an embodiment of a visual communication system 200 that demonstrates an interleaved array of display pixels and image sensors. The front view represents what a participant of a communication session, such as illustrated in FIG. 1, may view. The display pixels may be liquid crystal display (LCD) pixels and the image sensors may be charge-coupled device (CCD) sensors. Other display pixels and image sensors may be used. For example, the display pixels may be light-emitting-diodes (LED). As discussed below, the display pixels and image sensors may be located on separate layers or substrates that form the visual communication system. The display pixels and image sensors of the two different arrays are inter-dispersed to allow video communication participants the perception of looking directly at each other (i.e., directly at the screen) instead of communicating through the disparate axes of a PC camera and a screen (e.g., a computer monitor).

Figure 3:
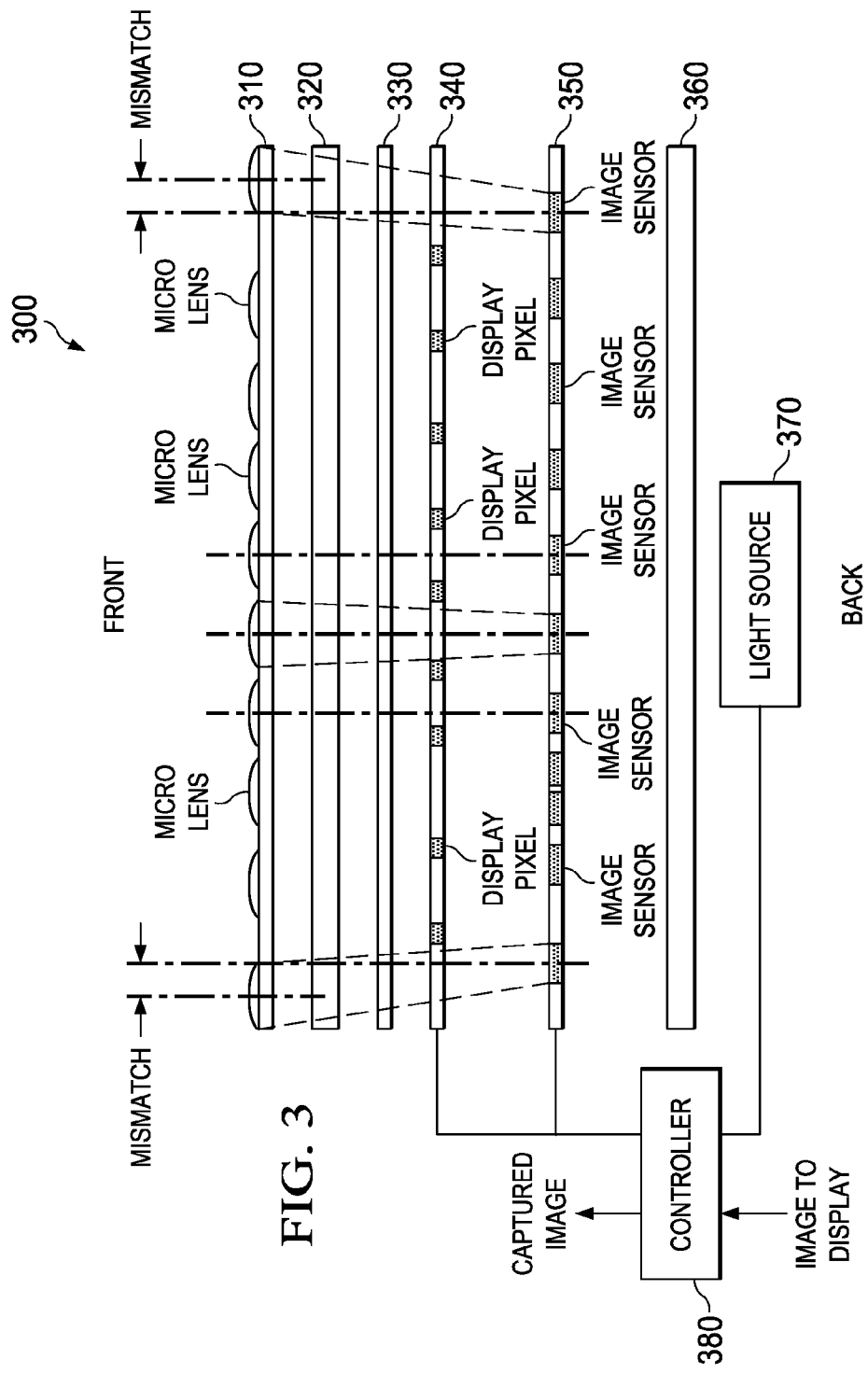
FIG. 3 illustrates an exploded view of an embodiment of a visual communication system constructed according to the principles of the invention.

The display pixels and image sensors can be positioned on the visual communication system such that every other pixel or sensor, both horizontally and vertically, is an opposite type. In some embodiments, every other pixel may not be an opposite type as illustrated in FIG. 3. The display pixels and image sensors can be interleaved on a pixel-group-by-pixel-group basis or a pixel-by-pixel basis. The image sensors and display sensors of FIG. 2, therefore, can represent a single pixel or a group of pixels. A single pixel or group of pixels of the display pixel array is identified as pixel 210 and a single sensor or group of sensors of the image sensor array is identified as pixel 220. The input and output axes of the visual communication system may be substantially the same since each would be at essentially the same point of the visual communication system. The viewing disparity would therefore be greatly reduced and perhaps substantially eliminated.

FIG. 3 illustrates an exploded view of an embodiment of a visual communication system 300. The visual communication system 300 includes a lens substrate 310, a glass cover 320, a color filter 330, an optical output substrate 340, an optical input substrate 350, a glass substrate 360, a light source 370 and a controller 380.

The glass cover 320 and the glass substrate 360 may be conventional components typically found in an LCD device. On the outside surface of both the glass cover 320 and the glass substrate 360 are polarizing films that are at right angle to each other, respectively. The color filter 330 may also be a typical color filter found in a conventional LCD device. The color filter 330 may include sub-pixels of red, green and blue to form a single display pixel. The light source 370 may be conventional light source included within an LCD device. For example, the light source 370 may be an array of LEDs.

The lens substrate 310 includes an array of micro lenses. The micro lenses may be on an outside surface. Each of the micro lenses of the array is arranged on the lens substrate 310 to capture light from a different viewing area and provide light input from that area to an image sensor of the optical input substrate 250. The combined light captured by the array of micro lenses is provided to the optical input substrate 350, similar to a digital camera, to represent an image from the field of view of the visual communication system 300.

The shape of the micro lenses of the lens substrate 310 may vary in different embodiments. The various lateral shapes may include, for example, a circle, an oval, a square and a rectangle. The focal length of some micro lens in any one embodiment may also vary to compensate for changes in the distance from the various micro lenses to the object in the field of view. The thickness of some of the micro lenses, for example, may vary. Additionally, the lens substrate 310 may be constructed using different etching technology commonly used in the art. In one embodiment, the lens substrate 310 may be manufactured according to U.S. Pat. No. 6,926,850, issued to Belle on Aug. 9, 2005, entitled "Method for Making Micro Lenses," commonly assigned with the invention and incorporated herein by reference in its entirety.

Figure 5:
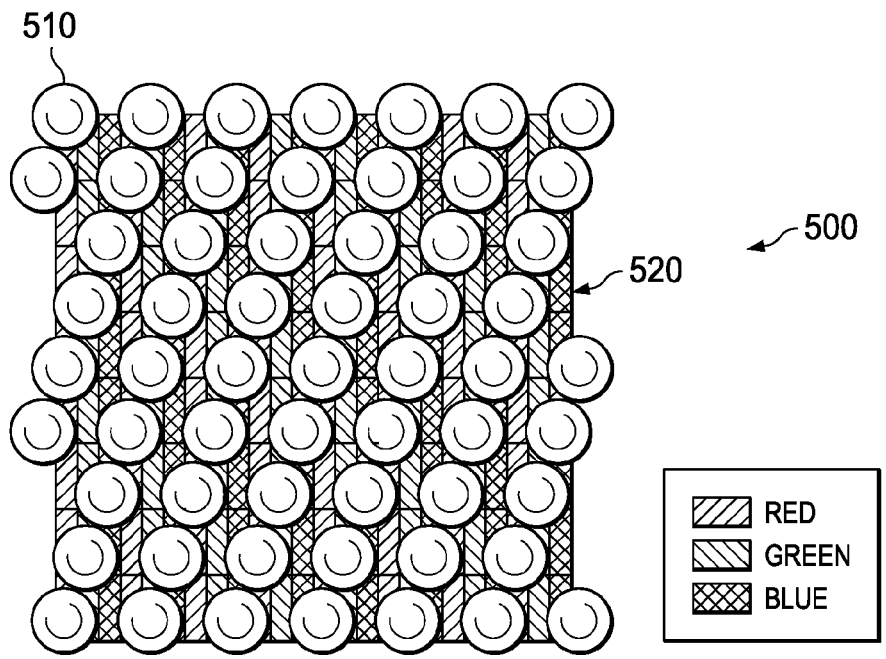
FIG. 5 illustrates a front view of a visual communication system that represents the configuration of a lens substrate constructed according to the principles of the invention.

In FIG. 3, the lens substrate 310 is represented as an additional substrate that is placed in front of the glass cover 320. In other embodiments, the lens substrate 310 may be attached to the glass cover 320 by a conventional technique. Additionally, the array of micro lenses may be manufactured as part of the glass cover 320. In some embodiments, the lens substrate 310 may be a type of fly's eye which is well known to one skilled in the art. FIG. 5 illustrates a front view of a visual communication system that represents the configuration of a lens substrate, such as the lens substrate 310, with respect to a color filter, such as the color filter 330.

Figure 4:
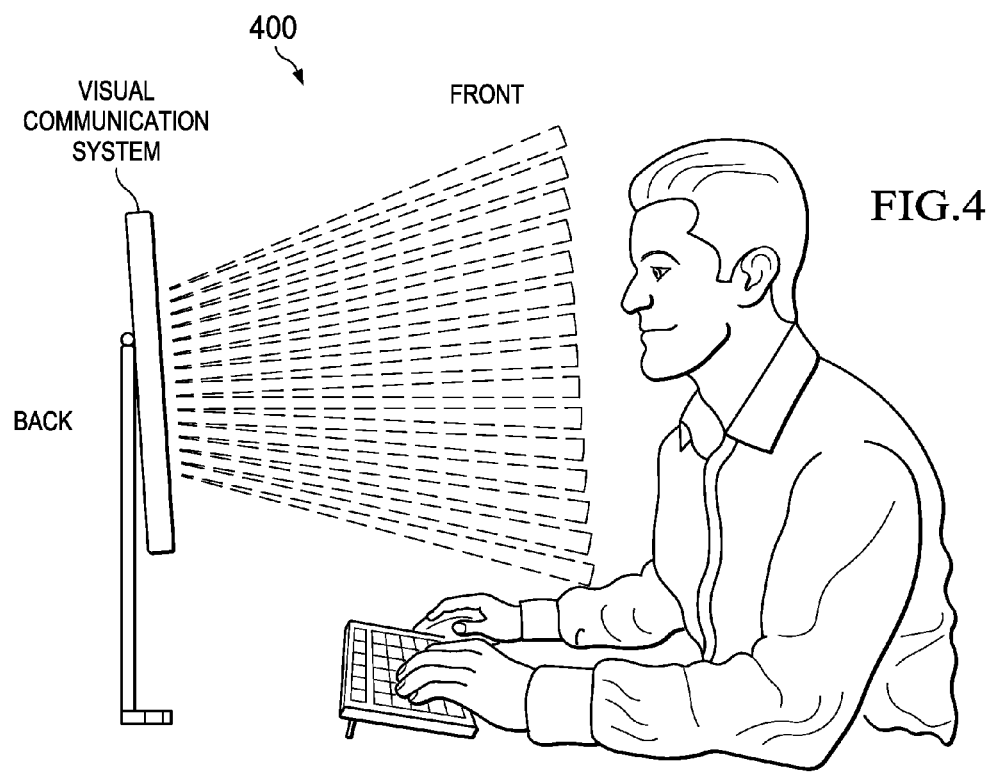
FIG. 4 illustrates a side view of a visual communication system and represents one embodiment of how light is captured by an array of micro lenses of the visual communication system.

FIG. 4 illustrates a side view of one embodiment of how light may be captured by the array of micro lenses of the lens substrate 310. A side view of a cone of light represents the field of view with each ray indicating an area captured by a specific micro lens of the array of micro lenses. To capture the complete field of view, the axes of image sensors and micro lenses may be somewhat mismatched. For example, around the center area of the optical input substrate 350, the micro lenses and the image sensors may be aligned (i.e., axes of each are aligned). Moving away from the axis of the lens substrate 310 and the optical input substrate 350, the micro lenses and the image sensors may become more misaligned (distance between the axis of each becomes greater) to ensure the entire field of view is captured. Thus, the array of micro lenses may not be evenly distributed and/or oriented in the same direction over the lens substrate 310 in order to capture light from each angle representing the field of view extending from the lens substrate 310.

As noted above, FIG. 4 represents a side view of one configuration of micro lenses that may be used to capture light. Other configurations may also be used to capture light from different directions. For example, micro lenses at the top of the lens substrate 310 may be positioned with respect to an image sensor to capture light for that image sensor that is from a bottom portion of the field of view.

In addition to the lenses being positioned to capture light representing the field of view, the lenses may also be positioned to allow viewing of display pixels of the optical output substrate 340. As such, gaps may exist between each of the micro lenses of the array. Between some such gaps or each such gap, a display pixel may be positioned to present a portion of an image to display.

The optical output substrate 340 includes the display pixels that, when illuminated by the light source 370, provide a display in accordance with an active backplane. In FIG. 3, the optical output substrate 340 includes conventional liquid crystal material that forms the display pixels or an array of conventional LEDs. The active backplane directs the operation of each of the display pixels. The active backplane, not illustrated in FIG. 3, is incorporated in the optical input substrate 350. The center area of the optical input substrate 350 may include the image sensors with edges reserved for the active display. In other embodiments, the active backplane for the optical output substrate 340 may be formed on a separate substrate from the optical input substrate 350. The active backplane may be a matrix of thin film transistors (TFT) with each TFT addressing a particular display pixel. The active backplane may operate as a conventional active backplane of an array-type LCD or LED device.

The optical input substrate 350 includes an array of image sensors that receive the light captured by the lens substrate 310. The image sensors convert the captured light into electrical signals to represent the visual data from the captured light. The image sensors may be, for example, charge coupling devices (CCD). Alternatively, the image sensors may be complimentary metal-oxide semiconductor (CMOS) sensors. Both of these sensors are employed in conventional digital cameras and well known in the art.

The controller 380 may receive and process the electrical signals from the array of image sensors for transmission. The active backplane may be used to address the image sensors in addition to the display pixels. Switches, controlled by the controller 380, may be used to alternate between controlling the image sensors of the display pixels. Alternatively, a separate matrix of controls may be used to address the array of image sensors. The control matrix for the image sensors may be located on the inner surface of the glass substrate 360. In some embodiments, the controller 380 may be coupled to a memory and send the captured image or images to be stored therein. The controller 380 also controls illumination of the optical output substrate 340 to provide a display. Accordingly, the controller 380 may be a processor typically included in an array-type LCD or LED device that in addition to the various functions typically performed such as directing the backplane for LCD or LED pixels, is configured to perform the functions described herein. The controller 380, therefore, may direct operation of the image sensors and the display pixels.

Additionally, the controller 380 may be configured to direct the light source 370 to cycle between an illumination cycle and a black cycle. During the illumination cycle, the light source 370 is on and the display pixels are illuminated. During the black cycle, the light source is off and light is received by the images sensors. The percentage of time where the light source 370 is on versus when the light source is off can vary in different embodiments depending on the efficiency of the image sensors. In some embodiments, the light source 370 is cycled off 10% or about 10% of the time. In other embodiments, the light source 370 may cycle off up to or about to 50% of the time. The controller 380, therefore, may direct the light source 370 to cycle off within a range of 10% to 50% of the time. The controller 380 can balance between brightness needed for the optical output substrate 340 and the amount of light needed to receive for the image sensors of the optical input substrate 350.

In other embodiments, instead of the controller 380 directing cycling between illumination and black cycles, an electrode may be incorporated with the display pixels to ensure at least some of the display pixels are transparent to allow light to get through to the image sensors during periods when collecting light. The controller 380 can be configured to coordinate transparency of the display pixels when an image is being captured. For example, conventional display systems employing a color sequential scheme expose at least three different color fields from a color video source. Accordingly, the controller 380 can increase the dead time between two particular color frames and introduce a "dummy frame" where all pixels are driven to full transparency.

When detecting an image, the controller 380 can control the time interval when the image sensors are collecting light. Thus, similar to some conventional detector arrays like CCD's, the controller 380 can be used to manage an "electronic shutter" to control the time interval for when the image sensors are collecting light.

The controller 380 may be one of various conventional digital data processors that are programmed or store executable programs of sequences of software instructions to perform one or more of the above functions. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the above described functions.

FIG. 5 illustrates a diagram of an embodiment of a visual communication system 500. FIG. 5 illustrates a lens substrate 510 in front of a color filter 520. The lens substrate 510 includes an array of micro lenses. The color filter 520 includes sub-pixels of red, green and blue filters that are used to create each color display pixel. Each contiguous micro lens of the lens substrate 510 employs a different color filter (red, green or blue) from the color filter 520.

As FIG. 3 illustrated, the color filter 520 may be positioned between the glass cover and the optical output substrate of a visual communication system. In other embodiments, the visual communication system 500 may perform color filtering for the image sensors as typically performed in a conventional digital camera. As such, the color filter 520 may be located on top of the optical input substrate. For example, the color filter 520 may be located between an optical output substrate and an optical input substrate.

The micro lenses can be positioned such that every neighbor lens can employ a different color filter. The position of the micro lenses may have walk-off in respect to the center of each color segment such that the direction of the light captured by the image sensors changes as function of the overall position on the display.

Figure 6:
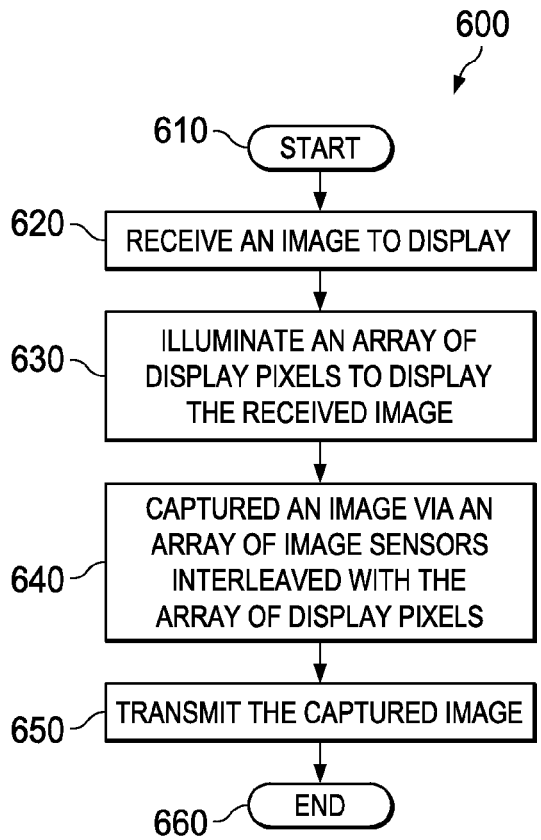
FIG. 6 illustrates a flow diagram of a method of conducting two-way visual communication carried out according to the principles of the invention.

FIG. 6 illustrates a flow diagram of a method 600 of conducting two-way visual communication. The method 600 discloses employing a single visual communication system to operate as a display and as a camera for a single communication session. The method 600 begins in a step 610.

An image to display is then received in a step 620. The image may be received from a remote apparatus. For example, the image may be received from a distal computer employing a PC camera via a computing network. In some embodiments, the received image may be a video of a participant in a voice-video communication session.

After receiving the image, an array of display pixels is illuminated to display the received image in a step 630. The display pixels may be liquid crystal display pixels or light-emitting-diode display pixels. An active backplane of thin-film transistors (TFTs) may be used to address the array of display pixels to present the received image.

In a step 640, an image is captured via an array of image sensors inter-dispersed with the array of display pixels. The captured image may be of a second participant in the voice-video communication session. In one embodiment, the received image may be received at a first apparatus from a second apparatus and the captured image is of the second participant located within the field of view of the first apparatus. The first and second apparatus may both include a visual communication system as described herein.

The illumination of the array of display pixels may occur in cycles. A processor may be used to control the illumination of the array. The processor may also coordinate capturing the image between the illuminating cycles. A controller, such as the controller 380, may be used as the processor.

The processor may also block unwanted absorbed-light by the image sensors from a back light of the visual communication system. The processor may compensate for light bleeding over to the image sensors by executing a software program directed to canceling unwanted light from a captured image.

The method 600 then proceeds by transmitting the captured image in a step 650. The captured image may be transmitted from the first apparatus to the second apparatus. The captured image may be transferred over a computing network including the Internet. The first and second apparatus may be computers, (e.g., a personal computer or a laptop) that include a visual communication system as described herein. After transmitting the captured image, the method 600 ends in a step 660.

The disclosure describes a single screen that can be used for a display and for a camera. The screen may include an array of display pixels to output an image and an array of image sensors to absorb light and represent an image. The array of image sensors and display pixels can be laterally inter-dispersed including interleaving the image sensors and display pixels such that every other pixel or groups of pixels are the opposite type. The input and output axes of the screen would then be essentially at the same point.

Those skilled in the art to which the invention relates will appreciate that other and further additions, deletions, substitutions and modifications may be made to the described embodiments without departing from the scope of the invention.

What is claimed is:

1. An apparatus, comprising:
   a lens substrate having a first array of micro lenses on one side thereof;
   an optical output substrate having a second array of display pixels; and
   an optical input substrate having a third array of image sensors laterally inter-dispersed with respect to display pixels of said second array and positioned to receive light from said micro lenses of the first array.

2. The apparatus as recited in claim 1 wherein each image sensor of said array of image sensors is positioned with respect to a single micro-lens of said array of micro lenses to receive captured light therefrom.

3. The apparatus as recited in claim 1 wherein said optical output substrate is in front of said optical input substrate.

4. The apparatus as recited in claim 1 wherein said display pixels of said second array are laterally interleaved with said micro lenses of said first array.

5. The apparatus as recited in claim 1 wherein said display pixels are liquid crystal display pixels.

6. The apparatus as recited in claim 1 wherein said display pixels are light-emitting-diode display pixels.

7. The apparatus as recited in claim 1 wherein said image sensors are selected from the group consisting of:
   charge coupling devices, and
   complimentary metal-oxide semiconductor (CMOS) sensors.

8. The apparatus as recited in claim 1 wherein said image sensors and said display pixels are interleaved both horizontally and vertically.

9. A visual communication system, comprising:
   a lens substrate having an array of micro lenses on one side thereof;
   an optical output substrate having an array of display pixels;
   an optical input substrate having an array of image sensors being laterally interleaved with respect to said display pixels of said optical output substrated and being positioned to receive light from said array of micro lenses;
   at least one active matrix to address said array of display pixels and said array of image sensors; and
   a controller configured to direct addressing of said array of image sensors and said array of display pixels via said at least one active matrix.

10. The visual communication system as recited in claim 9 wherein said controller is further configured to cycle between an illumination cycle and a black cycle, wherein during said illumination cycle said array of display pixels display a received image and during said black cycle said array of image sensors capture an image represented by said received light.

11. The visual communication system as recited in claim 9 wherein said at least one active matrix is formed on said optical input substrate.

12. The visual communication system as recited in claim 9 wherein said image sensors are charge coupled devices and said display pixels are liquid crystal display pixels.

13. The visual communication system as recited in claim 9 wherein spacings between neighboring ones of said micro lenses varies over said array of micro lenses.

14. The visual communication system as recited in claim 9 wherein said image sensors and said display pixels are laterally interleaved both horizontally and vertically.

15. The visual communication system as recited in claim 9 further comprising a glass cover and a glass substrate, said optical input substrate and said optical output substrate positioned between said glass cover and said glass substrate.

16. The visual communication system as recited in claim 15 further comprising a color filter positioned between said glass cover and said glass substrate.

17. A method of conducting two-way visual communication, comprising:
   receiving a first image to display;
   illuminating an array of display pixels to display said first image to a viewer; and
   capturing a second image via an array of image sensors, said image sensors being laterally interleaved between said display pixels.

18. The method as recited in claim 17 wherein said received image is received at a first apparatus from a second apparatus, said method further comprising transmitting said captured image from said first apparatus to said second apparatus.

19. The method as recited in claim 17 wherein said received image is one image of a video stream.

20. The method as recited in claim 17 wherein said illuminating occurs in cycles and said capturing occurs between two of said illuminating cycles.

* * * * *